June 19, 1962
R. L. VAN ALLEN
3,040,247
MAGNETIC FIELD DETECTOR
Filed Jan. 21, 1958
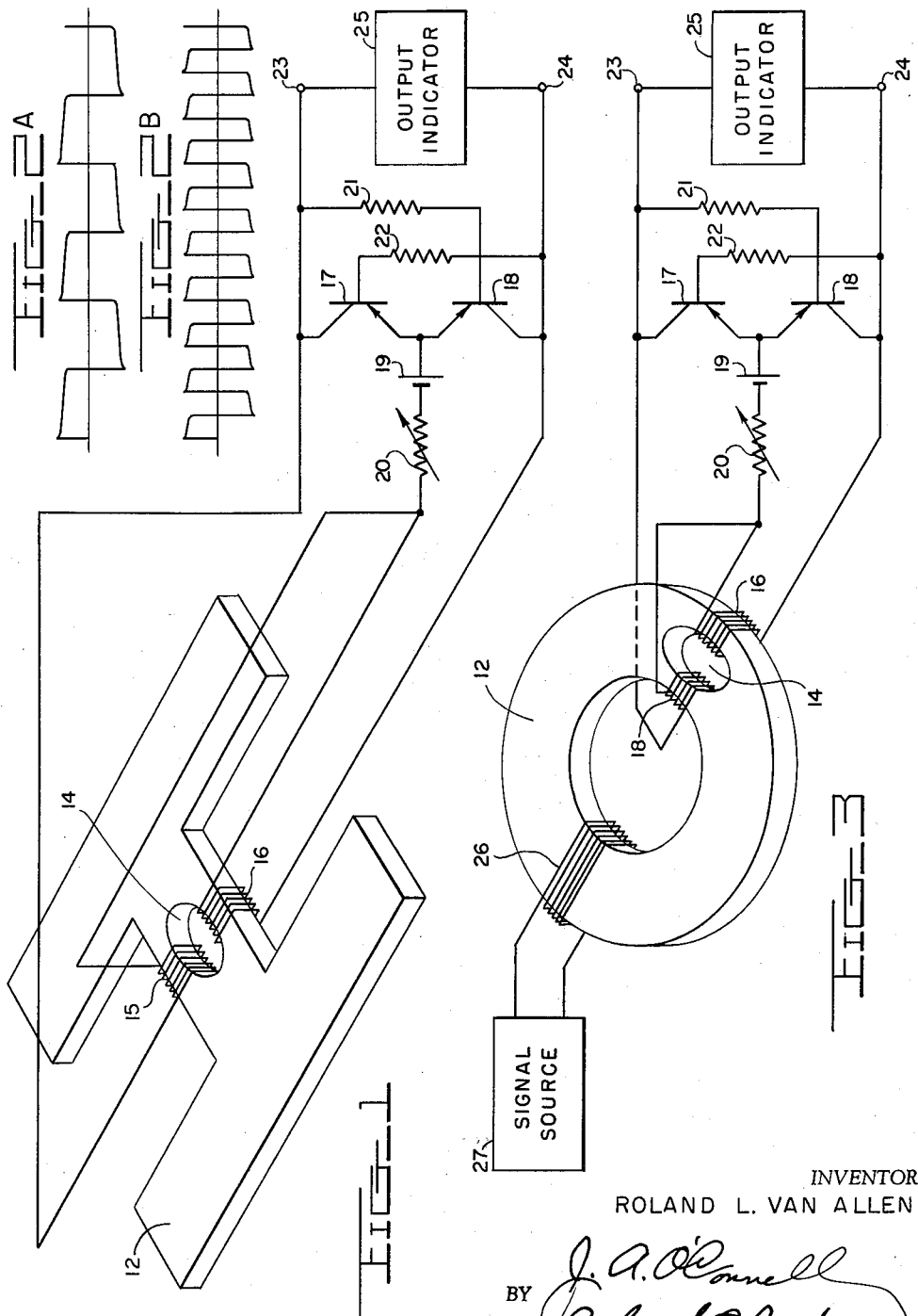
INVENTOR
ROLAND L. VAN ALLEN
ATTORNEYS

3,040,247
MAGNETIC FIELD DETECTOR
Roland L. Van Allen, 130 Artlee Ave., Butler, Pa.
Filed Jan. 21, 1958, Ser. No. 710,373
1 Claim. (Cl. 324—43)
(Granted under Title 35, U.S. Code (1952), sec. 266)

The invention described herein may be manufactured and used by or for the Government of the United States of America for governmental purposes without the payment of any royalties thereon or therefor.

This invention relates in general to magnetic field detecting devices and in particular to devices for detecting magnetic fields of relatively low flux density.

It will be appreciated that a compact assembly adapted to provide a reliable indication of the flux density of magnetic fields would be exceptionally useful in a wide variety of applications where the presence or absence of magnetic fields is a critical factor. Such a device would be useful in precise instrumentation assembly work where stray magnetic fields should be avoided, for example. In addition, it is frequently desirable that the detection device have minimum power requirements in order that the device may permit sentineling duty over an extended period of time without servicing.

Accordingly;

It is an object of this invention to provide a reliable device for indicating the flux density of a magnetic field in terms of frequency variations proportional thereto.

It is another object of this invention to provide a compact lightweight device for the detection of magnetic fields.

It is still another object of this invention to provide a relatively inexpensive device for the detection of magnetic fields which has minimum power requirements.

Other objects of this invention will become apparent upon a more comprehensive understanding of the invention for which reference is had to the following specification and drawings wherein:

FIGURE 1 is a diagrammatic and schematic showing of a first embodiment of the present invention.

FIGURES 2a and 2b are graphical showings of several output waveforms for the embodiment of FIGURE 1.

FIGURE 3 is a diagrammatic and schematic showing of a second embodiment of the present invention.

Briefly, the device of this invention employs a magnetic core of selected configuration as a sensing element and a novel magnetic multivibrator in conjunction therewith such that the flux condition of the magnetic core controls the frequency of the multivibrator output within a predetermined frequency range. In accordance with the invention, the sensing element is subjected to the magnetic field under investigation and the change in frequency which occurs in the multivibrator output is indicative of the flux density.

Referring now to the drawings:

FIG. 1 depicts a first embodiment of the device of this invention in a typical earth's magnetic field measurement application. In this embodiment the magnetic sensing element 12 has an H configuration with an aperture, indicated at 14, in the cross member between the two parallel members.

A two state multivibrator of the type described and claimed in the copending application serial No. 694,058, now Patent No. 2,963,658, entitled "A Square Wave Resistive Coupled Magnetic Multivibrator," which was filed in behalf of Robert W. Rochelle on or about November 1, 1957, is shown connected to the sensing element 12 via the windings 15 and 16 which are each wound through the aperture indicated at 14. For a full and complete understanding of the operation of this type of multivibrator, reference is had to the abovementioned copending application.

In general explanation of the two state multivibrator shown in the drawing, the device involves a first conducting loop which includes the winding 15 and a second conducting loop which includes the winding 16. These first and second conducting loops are alternately operative by means of the PNP type transistors 17 and 18, respectively, which perform a switching function in the device of this invention.

As is well known in the art, in the operation of a PNP type transistor as an on-off switching element, the collector and emitter impedance of the transistor is very high when both the collector and emitter voltages are equal to or more negative than the base voltage. As soon as the base becomes slightly negative with respect to the emitter, however, the emitter-collector impedance drops to the vicinity of one ohm.

In FIG. 1 the emitter and base of the transistor 17 are connected, via voltage source 19 and resistance 20 in series, across the winding 16 and the emitter and base of the transistor 18 are connected, via voltage source 19 and resistance 20 in series, across the other winding 15. The collectors of the transistors 17 and 18 are connected, as shown, to the windings 15 and 16, respectively, to complete the circuits in the two conducting loops. Thus, in each state, the polarity and magnitude of the voltage across one winding controls the on-off switch in the conducting loop which includes the other winding. The windings are wound on the sensing element 12 through the aperture indicated at 14 in opposite rotational sense to produce flux changes in opposite directions with respect to each other. It will be seen that the flux path for the field generated by current flow in the windings 15 and 16 is around the aperture indicated at 14.

In the embodiment of FIG. 1 the voltage source 19 produces current flow in either of the two conducting loops as determined by the switching transistors 17 and 18. It is understood, of course, that it is not essential to the device of this invention that a common voltage source be employed and that separate voltage sources for the two conducting loops may be substituted, if desired. The resistance 20 also acts in either of the two conducting loops—to limit the current flow therein. Likewise, it is not essential to this invention that a common current limiting impedance be employed and separate impedances for the two conducting loops may be substituted, if desired.

In simple operational analysis of the multivibrator shown in FIG. 1, at the beginning of one state the flux in the flux path around the aperture is in one of the two saturation conditions and the polarity of the winding 16 has reduced the collector to emitter impedance of transistor 17 which, in turn, effectively applies the voltage source 19, via the resistance 20 across the winding 15 to cause current flow therein. At the same time the polarity of the winding 15 maintains the transistor 18 in the nonconducting state to prevent current flow in the winding 16. The current flow in the winding 15 produces a flux level change in the opposite direction to that produced by the winding 16 in the previous state and the flux level in the flux path around the aperture beings to return to the other saturation condition. Once the other saturation condition is reached the polarity of the winding 15 reduces the collector to emitter impedance of transistor 18 which, in turn, effectively applies the voltage source 19, via the resistance 20, across the winding 16 to cause current flow therein. Meanwhile, of course, the transistor 17 switches to its nonconduction state to block current flow in the winding 15. Thereupon the process repetitiously continues.

It will be noted that while the bases and collectors of the two transistors are interconnected to facilitate the alternate switching action, they are not directly cross coupled in the embodiment of FIG. 1. The addition of the interconnecting resistive impedances 21 and 22 decreases the loading effect across the output terminals 23 and 24. Thus, while the impedances 21 and 22 are not essential and may be omitted, if desired, the result will be a lower output voltage.

The waveform depicted in FIG. 2a is illustrative of the output of the multivibrator exemplarily shown in FIG. 1. This square waveform represents the output of the multivibrator for the zero input condition, that is, for the condition in which the sensing element is not exposed to external magnetic fields. It will be appreciated that the period of each half cycle of the waveform shown is directly dependent upon the value of the current limiting impedance 20. Thus, the output frequency of the multivibrator for the no input condition can be controlled by varying the value of impedance 20. In the operation of the device of this invention, the prime function of the impedance 20 is to establish the reference frequency.

The waveform depicted in FIG. 2b is also illustrative of the output of the multivibrator shown in FIG. 1 but in another operational state. This square waveform represents the output of the multivibrator when the sensing element is exposed to an external magnetic field which affects the flux condition of the element. It will be noted that the frequency of the waveform shown in FIG. 2b is greater than the frequency of the waveform shown in FIG. 2a. In accordance with the basic principle of this invention, the difference in frequency with respect to the reference frequency (FIG. 2a) is proportional to the effect of the external magnetic field on the sensing element. It will be appreciated that the difference in frequency will increase as the flux density or strength of the external magnetic field is increased from zero in either direction or as the sensing element is moved closer to an external magnetic field of constant flux density.

Referring again to the embodiment of FIG. 1, the output terminals 23 and 24 are shown connected to an output indicator 25, which is depicted in block diagram for purposes of simplicity. It is understood that a wide variety of output indicators might be employed with the device of this invention. For example, the output indicator 25 might be a simple meter movement as illustrated. Alternatively, the indicator 25 might be an AM or FM radio receiver. It will be appreciated that the waveform produced by the multivibrator is rich in harmonics, and that certain of these harmonics may be detected by a standard radio receiver connected to the output. Thus extremely small changes in the magnetic field under investigation, on the order of several gamma, may be observed either as a needle movement or as a change in the tone of the audio output of a receiver.

The sensing element 12 in the embodiment of FIG. 1 may be made of any saturable magnetic material which is sensitive to external magnetic fields. The saturable magnetic material may be in the form of a solid slab or in laminated form to reduce eddy current losses, if desired. As an example of a typical sensing element, one of the 50% nickel-iron magnetic materials which are commercially known as, "Orthonol," "Deltamax" or "Supermalloy" might be utilized. Of course, other saturable magnetic materials having a greater or lesser sensitivity to external magnetic fields may be directly substituted for the suggested magnetic materials depending upon the requirements of the particular application.

FIG. 3 depicts a second embodiment of the device of this invention which is substantially similar to the embodiment of FIG. 1 but incorporates a sensing element having another configuration plus auxiliary means for energizing the sensing element.

As shown in FIG. 3 the sensing element may have a toroidal configuration with the axis of the aperture parallel to the axis through the center of the toroid ring. The winding 26 encompasses a section of the toroid ring such that current flow in the winding produces a magnetic field which affects the flux condition of the entire toroid ring. By the application of a low frequency signal from signal source 27 to the toroid ring, via the winding 26, harmonics in the output of the multivibrator may be modulated. The modulated output permits the use of even more sensitive output indicator means. For example, a standard phase comparator which is capable of comparing the phase between two frequencies might be employed as the output indicator 25 to show a deviation in the phase relation between a selected harmonic and the modulation signal due to the presence of an external magnetic field.

It will be appreciated that the embodiments of FIGS. 1 and 3 are equally suitable for use in general external magnetic field investigation applications. The embodiment of FIG. 1 is to be preferred in directional applications, that is, where the direction of the magnetic field is significant. For example, the embodiment of FIG. 1 would be especially useful in the measurement of the orthogonal components of a magnetic field at a point in space. On the other hand, the embodiment of FIG. 3 offers the advantage of a more exacting measurement of frequency deviation and would be preferred for the detection of external magnetic fields of relatively low flux density.

It is understood, of course, that this invention is not to be limited to the specific embodiments exemplarily shown herein and that many modifications of the embodiments shown are within the purview of this disclosure. For example, other magnetic multivibrators, the output frequency of which is dependent upon the portion of the hysteresis loop involved during each state, may be readily substituted for the magnetic multivibrator described in detail in this specification.

Finally, it is understood that this invention is to be limited only by the scope of the claim appended hereto.

What is claimed is:

A device for determining the flux density of an external magnetic field comprising a slab of saturable material adapted to be exposed to the external magnetic field under investigation; said slab having a toroid configuration and having at least one aperture therein; the axis of said aperture being substantially parallel to the axis of said toroid configuration; a first winding wound on said slab through said aperture therein and encircling a first section of said slab; a second winding wound on said slab through said aperture therein and encircling a second section of said slab; said first and second windings being wound in opposite rotational sense with respect to each other; electrical energy means; first and second on-off switching means; said first winding, said energy means, and said first switching means being serially connected to form a first current conductive loop said second winding, said energy means, and said second switching means being serially connected to form a second current conductive loop; said first and second current conductive loops being operative to change the flux level in the flux path around said aperture in opposite directions; means connecting said first switching means to said second winding and means connecting said second switching means to said first winding such that said first and second switching means are rendered alternately conductive, said first and second switching means being responsive to a flux level of selected magnitude in said flux path around said aperture produced by said second and said first conductive loop, respectively; a third winding wound on said slab and encircling a third section of said slab; a low frequency signal source connected to said third winding; and frequency comparison means operative to compare the output of said signal source with the frequency of the alternate operation of said first and second switching means.

References Cited in the file of this patent

UNITED STATES PATENTS

| | | |
|---|---|---|
| 2,047,609 | Antrankian | July 14, 1936 |
| 2,480,265 | Rubenstein | Aug. 30, 1949 |
| 2,528,703 | Muffly | Nov. 7, 1950 |
| 2,854,580 | Uchrin et al. | Sept. 30, 1958 |
| 2,912,653 | Tillman | Nov. 10, 1959 |
| 2,991,414 | Tillman | July 4, 1961 |

FOREIGN PATENTS

| | | |
|---|---|---|
| 925,191 | Germany | Nov. 14, 1940 |
| 579,439 | England | Aug. 2, 1946 |

OTHER REFERENCES

Publication: Electronics, January 1950, pp. 165–171.

Publication: Radio-Electronics, March 1958; pp. 62, 63, 80 and 81.